United States Patent [19]

Ebihara et al.

[11] Patent Number: 5,311,313
[45] Date of Patent: May 10, 1994

[54] APPARATUS FOR REMOVING GHOST FROM TELEVISION SIGNALS INCLUDING A TRANSVERSAL FILTER USING COEFFICIENT DATA WITH UNNECESSARY HIGH FREQUENCY COMPONENTS REMOVED THEREFROM

[75] Inventors: Kazuyuki Ebihara; Shigehiro Ito, both of Toride; Yuji Nishi; Tatsushi Koguchi, both of Iwai, all of Japan

[73] Assignee: Victor Company of Japan, Ltd., Yokohama, Japan

[21] Appl. No.: 997,575

[22] Filed: Dec. 28, 1992

Related U.S. Application Data

[62] Division of Ser. No. 700,700, May 16, 1991, Pat. No. 5,206,727.

[30] Foreign Application Priority Data

May 18, 1990 [JP] Japan .................................. 2-128346
May 18, 1990 [JP] Japan .................................. 2-128347

[51] Int. Cl.$^5$ .............................................. H04N 5/21
[52] U.S. Cl. .................................................. 348/614
[58] Field of Search ............... 358/167, 166, 905, 36, 358/37; H04N 5/21

[56] References Cited

U.S. PATENT DOCUMENTS

| | | | |
|---|---|---|---|
| 5,025,317 | 6/1991 | Koguchi | 358/167 |
| 5,053,870 | 10/1991 | Ito | 358/167 |
| 5,138,453 | 8/1992 | Kobayashi | 358/167 |

FOREIGN PATENT DOCUMENTS

| | | | |
|---|---|---|---|
| 0263582 | 12/1985 | Japan | 358/905 |
| 0137885 | 5/1989 | Japan | H04N 5/21 |
| 0222269 | 9/1990 | Japan | 358/905 |

Primary Examiner—James J. Groody
Assistant Examiner—Chris Grant
Attorney, Agent, or Firm—Jacobson, Price, Holman & Stern

[57] ABSTRACT

A television ghost removal apparatus comprises a transversal filter that receives input television signals, compensates waveform distortion included in the signals, and removes a ghost component; a waveform extractor that extracts signal waveforms of predetermined periods that include reference signals for ghost detection from the television signals; a coefficient setter that compares reference waveform signals and the extracted signal waveforms to obtain error signals, and sets coefficient data corresponding to the error signals, and in accordance with this coefficients data, changes filter coefficient of the transversal filter; a band limiter means for removing unnecessary high-region components included in the coefficient data, and supplying the coefficient data from which the unnecessary high-region components have been removed to the transversal filter means, the unnecessary high-region components being outside a frequency band of the reference signal; and a counter means for counting the number of times that the coefficient data have been generated by the coefficient setting means until the television signals return to a status where ghost has been removed, and for activating the band limiter means when the number of times reaches a predetermined number.

1 Claim, 5 Drawing Sheets

APPARATUS FOR REMOVING GHOST FROM TELEVISION SIGNALS INCLUDING A TRANSVERSAL FILTER USING COEFFICIENT DATA WITH UNNECESSARY HIGH FREQUENCY COMPONENTS REMOVED THEREFROM

This is a divisional of application Ser. No. 07/700,700 filed May 16, 1991, now U.S. Pat. No. 5,206,727.

BACKGROUND OF THE INVENTION

The present invention relates to an apparatus for the removal of ghost in television signals used in television receivers and video receivers that handle television signals.

FIG. 1 shows one example of a conventional ghost removal apparatus. The processing in this embodiment is all performed digitally.

The numeral 1 represents a transversal filter that has the television signals X(t)-as-the input, and which compensates for waveform distortion and removes the ghost component. In this embodiment, the filter is configured from a digital filter that has variable filter coefficients. Such a transversal filter 1 is set with a batch of filter coefficients that is of the opposite phase to a ghost component that is included in the input signals, for example. The output of the transversal filter 1 becomes the output image signals Y (t) and is also supplied to a waveform extraction circuit 2. The waveform extraction circuit 2 extracts reference signals inclined in predetermined periods in the television signals. These reference signals are of a pattern from which a reference timing in a horizontal scan can be detected, and FIG. 2 shows typical examples of a reference signal.

FIG. 2(a) and FIG. 2(b) respectively represent where step-shaped signals are partially overlapped, with FIG. 2(a) showing where the rising edge for example, of a step-shaped signal is used as the reference timing and FIG. 2(b) showing where the falling edge for example, of a step-shaped signal is used as the reference timing.

FIG. 2(c) is a pulse signal that is overlapped on a vertical synchro signal, and either the rising edge or the falling edge is used as the reference in this case as well.

In the 8-field sequence method, these reference signals (data) described above are obtained by subtraction from the data of a predetermined other field, of the data from a predetermined other field.

The above described specific pattern signals extracted by the waveform extraction circuit 2 are supplied to an adding and averaging circuit 3 and the adding and averaging circuit 3 smooths the noise components that are generated randomly in the output of the waveform extraction circuit 2. FIG. 3 shows a specific example of the circuits for the waveform extraction circuit 2 and the adding and averaging circuit 3.

In FIG. 3, the waveform extraction circuit 2 has a gate circuit 21 that passes an input signal which is applied to it at predetermined periods that include the reference signals, and the gate circuit 21 has its on and off controlled by control signals from a controller that is not indicated in the figure. The signals having a predetermined period and that have passed the gate circuit 21 are supplied to a memory 32 via an adder 31 of the adding and averaging circuit 3 and furthermore, the output of the memory 32 is fed back to the adder 31. More specifically, the adder 31 adds the signals that have been given a predetermined time delay and which have already been written in the memory 32, and supplies them to the memory 32 so that noise components that exist randomly in the direction of the time axis, for the output of the memory 32 is smoothed.

After this adding and averaging processing has been performed for a plural number of times, the gate circuit 33 becomes open in accordance with a take-in pulse supplied from the controller and the signals that have been added and smoothed are taken in.

Returning again to FIG. 1, the output of the adding and averaging circuit 3 has the influence of the DC portion removed by a differentiating circuit 4 and then, is compared with a reference waveform signal that is generated in a reference waveform generation circuit 5, with a subtractor 6 being used as the means of comparison. The output of the subtractor 6 is supplied to a magnification setting circuit 7 as error signals. The magnification setting circuit 7 determines the loop magnification and this set magnification is used as the basis for a coefficient setting circuit 8 to generate coefficient data in order to set the batch of filter coefficients of the transversal filter 1 described above.

In the manner described above, the configuration of a ghost removal circuit formed by a closed loop comprising the transversal filter 1, the waveform extraction circuit 2, the adding & averaging circuit 3, the differentiating circuit 4, the subtractor 6, the reference waveform generation circuit 5, the magnification setting circuit 7 and the coefficients setting circuit 8. More specifically, the filter coefficients of the transversal filter 1 change successively in accordance with the error signals that are obtained from the reference signals derived from the input television signals and the reference waveform signals generated in the circuit 5, and control of the closed loop is performed so as to remove the ghost component.

The following is a description of another example of a conventional ghost removal apparatus, with reference to FIG. 4.

The ghost removal apparatus according to the other example is the same as the apparatus described with reference to FIG. 1, except that the adding & averaging circuit 3 and the differentiating circuit 4 are absent, and hence duplication of description will be avoided by using corresponding numerals to represent corresponding portions.

The waveform extraction circuit 2 extracts the predetermined periods that include the specific pattern signals within the television signals, and in accordance with necessity, implements a predetermined waveform conversion such as differentiation, and outputs the signals. This specific pattern signal is a pattern that is used to detect and obtain the reference timing in a horizontal scan period, and FIG. 5 shows typical examples of this specific pattern signal. FIG. 5(a) and FIG. 5(b) show where respective step-shaped signals overlap one portion of a horizontal scan period, with FIG. 5(a) showing the cases where the rising edge of a step-shaped signal is used as the reference timing and FIG. 5(b) showing the case where the falling edge of a step-shaped signal is used as the reference timing. For example, when the falling edge portion of the step-shaped signal of FIG. 5(b) is differentiated, a pulse-shaped signal such as that shown in FIG. 5(c) is obtained. FIG. 5(d) is a step-shaped signal that has a narrow width and which overlaps the vertical synchro signal, and in this case as well, it is possible to use either the rising edge or the falling edge as the reference timing.

When a specific pattern signal extracted by the waveform extraction circuit 2 has waveform conversion processing such as differentiation or the like implemented, the subtractor 6 is used as the means of comparison to compare the reference signal that is generated from the reference waveform generation circuit 5. The output of the subtractor 6 is supplied to the magnification setting circuit 7 as the error signal. The magnification setting circuit 7 determines the magnification in order to determine the filter coefficients that are set in the transversal filter 1, and the magnification set in the magnification setting circuit 7 is used as the basis for the coefficient setting circuit 8 to generate the coefficient data that is used to set the filter coefficients of the transversal filter 1.

In the manner as has been described above, the ghost removal circuit is formed by a closed loop comprising the transversal filter 1, the waveform extraction generation circuit 5, the magnification setting circuit 7 and the coefficient setting circuit 8. More specifically, it is a circuit that obtains the reference timing from the specific pattern signals in the input television signals, performs successive changing of the filter coefficients of the transversal filter 1 in accordance with error signals obtained from the reference timing and the reference signals, and performs closed loop control so that the ghost components are removed.

Both of the two examples of the conventional technology described above are configured by a feedback loop and are ghost removal circuits comprising a feedback forward loop configured by disposing a waveform extraction circuit 2 on the input side of the transversal filter 1.

However, when there is a favorable S/N (signal to noise ratio) for the input television signals in the case of the former of the conventional apparatus and as shown in FIG. 6(a), there is a certain degree of noise removal performed by the adding & averaging processing but as shown in FIG. 6(b), in the status where the input television signals have a poor S/N, it is not possible to sufficiently suppress the noise by using only the adding & averaging circuit 3, and so it becomes impossible to correctly detect the ghost components that are included in the reference signals.

In addition, when pulse-type noise enters during the predetermined period that includes the reference signal, and when the waveform extraction circuit 2 extracts signals over than those of the predetermined periods and adding processing is performed in that state, a component that is not a ghost component is regarded as a ghost.

In either case, the error signals become the output from the subtractor 6 and ghost removal processing corresponding to this error data is performed to therefore cause problems with the output image.

Also, the coefficient data that are set by the coefficient setting circuit 8 in the case of the latter example of conventional technology has no band limit and so the frequency band component that has the coefficient data also has a component (high region component) other than the frequency band component that has the reference signals and there are cases where this component which is outside of the band causes the transversal filter 1 to perform erroneous filter action. In cases such as these, there is the disadvantage that the convergence to the ghost removal status is slowed.

SUMMARY OF THE INVENTION

A primary object of the present invention is to provide a ghost removal apparatus for television signals and that constantly monitors the S/N of input television signals, prohibits the setting of new coefficient data when the S/N is poor, judges the coefficient data that determine the filter coefficient of the transversal filter when when S/N has returned to a favorable level, prevents the performance of erroneous ghost removal and does not cause problems in the output television signals.

A secondary object of the present invention is to provide a ghost removal apparatus for television signals and that passes only a frequency band component having a reference waveform with respect to coefficient data when that coefficient data set in the transversal filter are generated, and that applies low-pass filter coefficient data so as to prevent other frequency components (high-region components) to the coefficient data that is set in the transversal filter described above, and therefore prevent the erroneous operation for the removal of ghost.

In order to attain these objectives, he main configuration of the ghost removal apparatus relating to the present invention is provided with a transversal filter along the input television signal path, and is a ghost removal apparatus that extracts signals of a predetermined periods and that includes reference signals for ghost detection, from the television signals, sets coefficient data corresponding to error signals obtained by comparing the reference signal and he extracted signal waveforms to obtain error signals, and that removes ghost in television signals by changing the filter coefficients of transversal filter, and is a S/N measurement circuit that monitors the S/N of the input television signals and a S/N judgment circuit that prohibits change of the filter coefficients when the S/N ratio is poor, and that initializes the coefficient data when the S/N of the input television signals has returned to a favorable status.

Also, in another aspect, the apparatus relating to the present invention is a a ghost removal apparatus that is provided with a transversal filter along the input television signal path, and extracts the signals of predetermined periods and that include a specific pattern signal for ghost detection from the television signals, compares the reference signals and the reference timing of within the specific pattern signals and sets coefficient data corresponding to the obtained error signals, and changes the filter coefficient of the transversal filter, and is configured with a band limiting means that removes unnecessary high-region components included in the coefficient data and supplies the coefficient data from which the unnecessary high-region components have been removed to the transversal filter, the unnecessary components being outside of the frequency band of the reference signal.

According to the ghost removal apparatus relating to the main configuration described above, when the S/N of the input television signals is poor, such as when for example, there is not sufficient noise removal processing by adding and averaging processing, there is no change of the filter coefficient and it is possible to suppress deterioration of the output image. In addition, when the S/N has recovered to a favorable status, there is the possibility that the status of the current ghost will differ from that of the former ghost and so the initialization of the generated coefficient data enables the performance of the generation of coefficient data suited to the current ghost status.

Accordingly, the S/N of the input television signals is always monitored and when the S/N has deteriorated, the changing of the filter coefficient of the transversal filter that performs the hosting removal is prohibited so that it is possible to prevent an adverse influence in the output image when error signals are erroneously generated by a noise component.

In addition, when the S/N has returned to a favorable status, the coefficient data is judged and so it is possible to prevent an adverse influence with respect to the generated coefficient data due to the former noise.

In addition, according to the ghost removal apparatus of the other aspect of the invention as described above, it is possible for the coefficient data that sets the filter coefficient of the transversal filter to not have an unnecessary band component an so it is possible to lessen the adverse influence due to external frequency components that have the reference waveform and for it to be possible to prevent misoperation of the ghost removal action and at the same time converge quickly to the ghost removal status.

Accordingly, the unnecessary high-region components outside of the frequency band that has the reference signals are removed in accordance with the influence due to components outside of the frequency band of the reference signals and so it is possible to prevent misoperation of the loop for ghost removal and for there to be no delay in the convergence.

Figure 1:
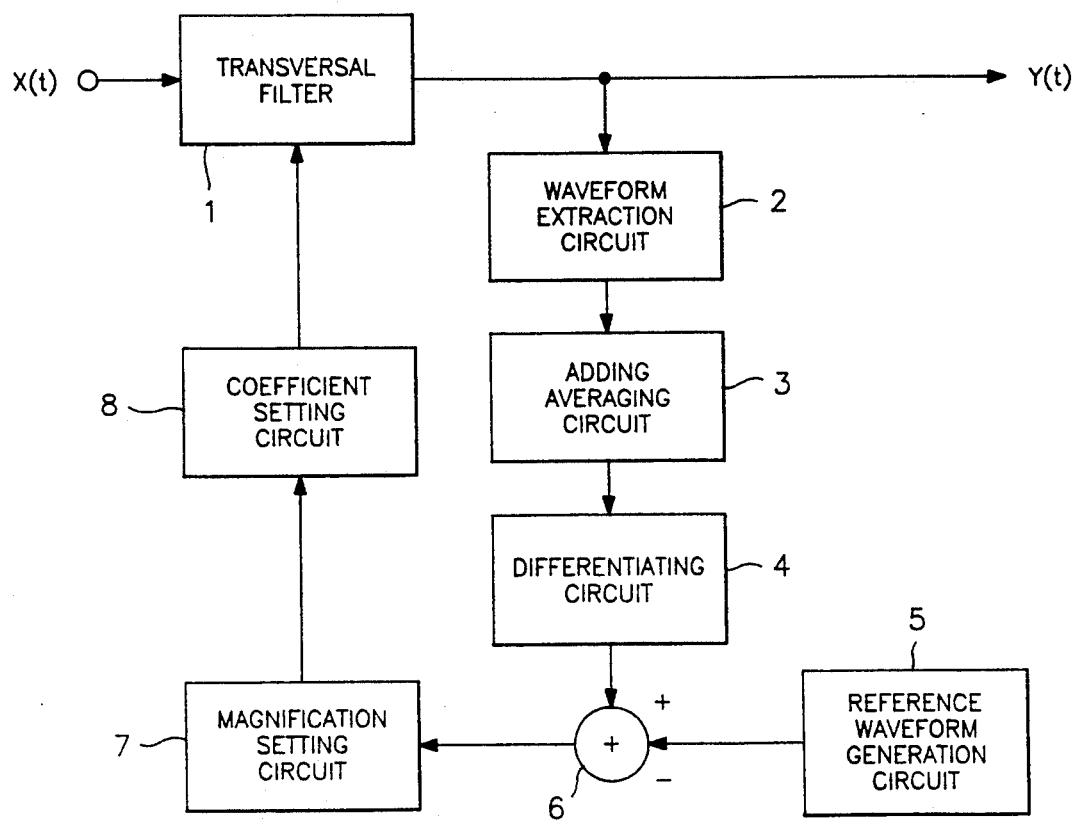
FIG. 1 is a block diagram that shows the configuration of one example of a conventional ghost removal apparatus.
Figure 2:
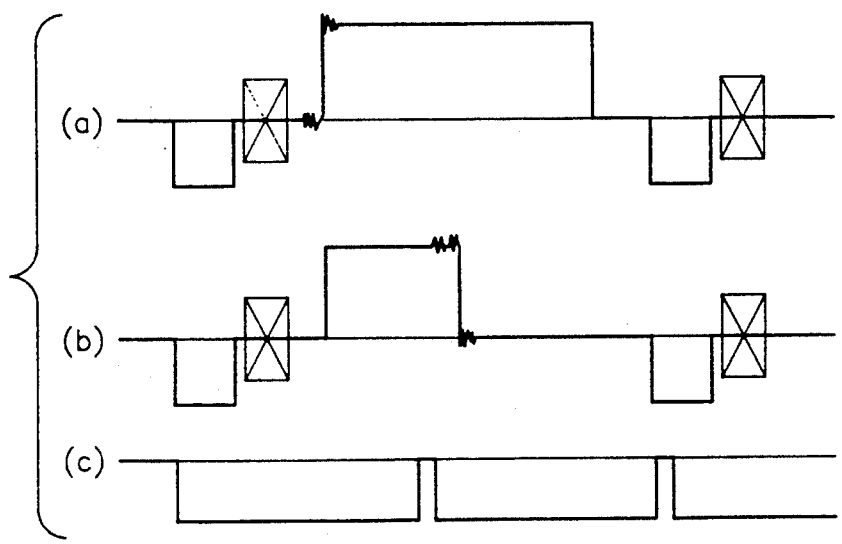
FIG. 2 is a waveform diagram showing specific pattern signals in the apparatus of the example shown in FIG. 1.
Figure 3:
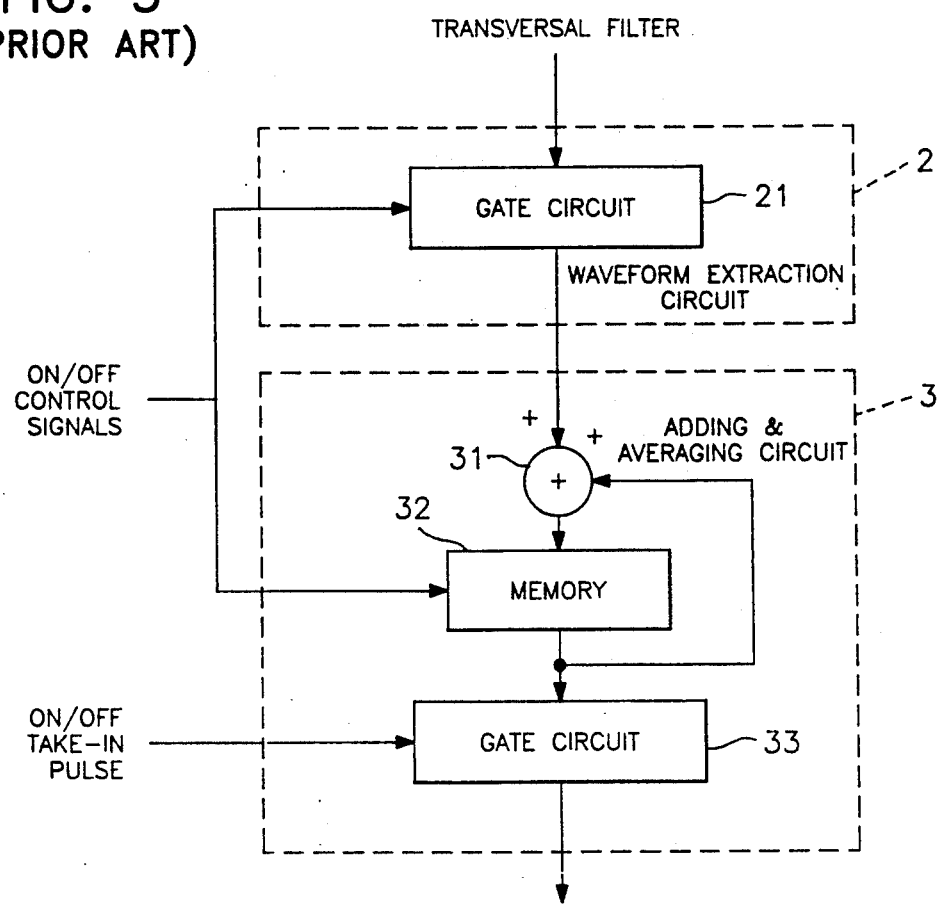
FIG. 3 is a block diagram showing the detailed configuration for one portion of the apparatus shown in FIG. 1.

DETAILED DESCRIPTION OF THE PREFERRED EMBODIMENTS the following is a detailed description of embodiments of the present invention, with reference to the appended drawings. Moreover, those portions that were described in the description of the conventional technology are indicated with the same reference numerals, and the corresponding descriptions of them have been omitted.

Figure 7:
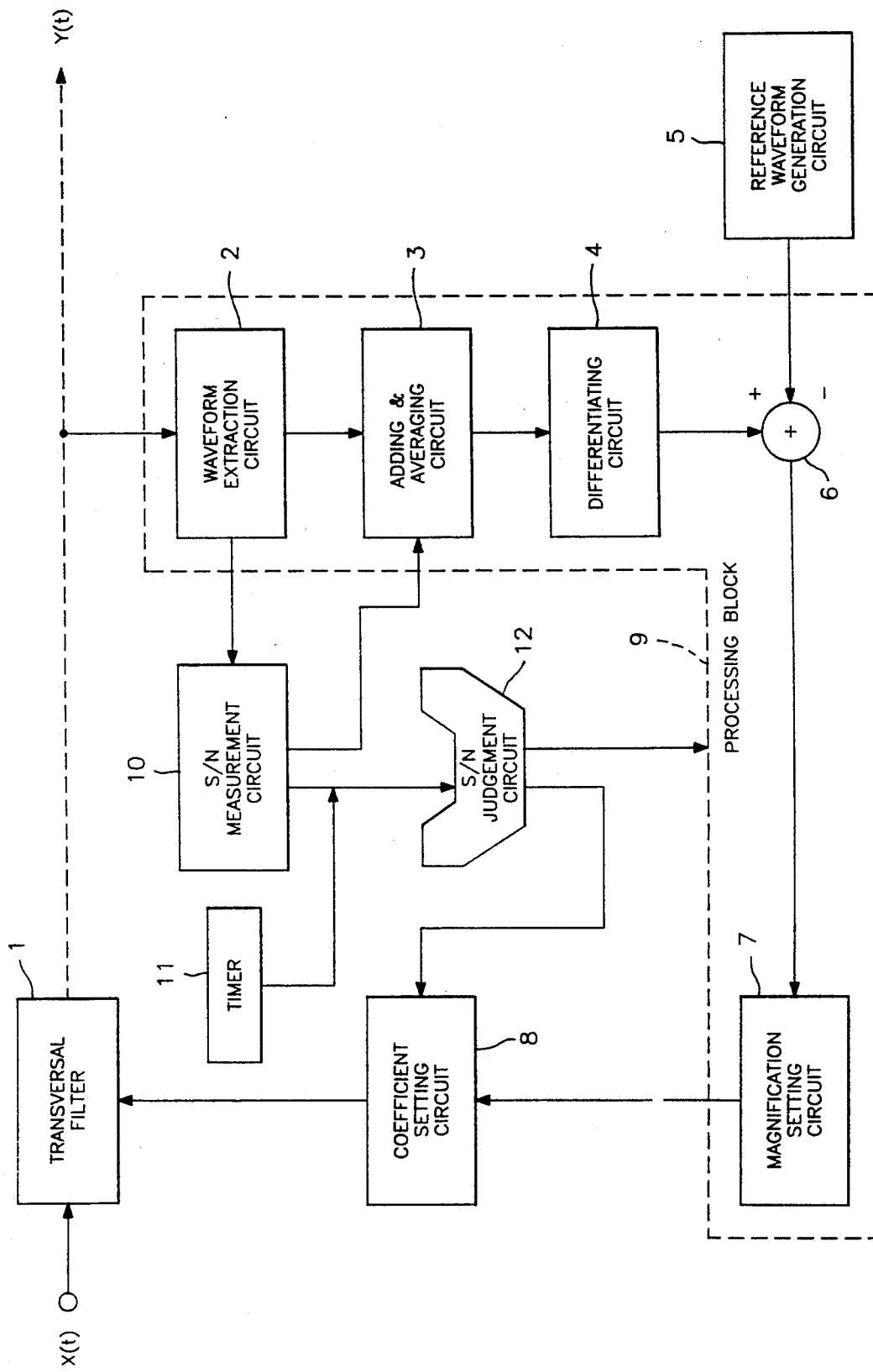
FIG. 7 is a block diagram that shows the configuration of a ghost removal apparatus according to this first embodiment of the present invention.

FIG. 7 is a block diagram that shows the configuration of a ghost removal apparatus according to this first embodiment of the present invention.

In the figure, the configuration of the ghost removal apparatus for closed loop control by a transversal filter 1, a waveform extraction circuit 2, a adding and averaging circuit 3, a differentiating circuit 4, a reference waveform generation circuit 5, a subtracter 6, a magnification setting circuit 7 and a coefficient setting circuit 8 is the same as the case for the conventional technology shown in FIG. 1.

Figure 6:
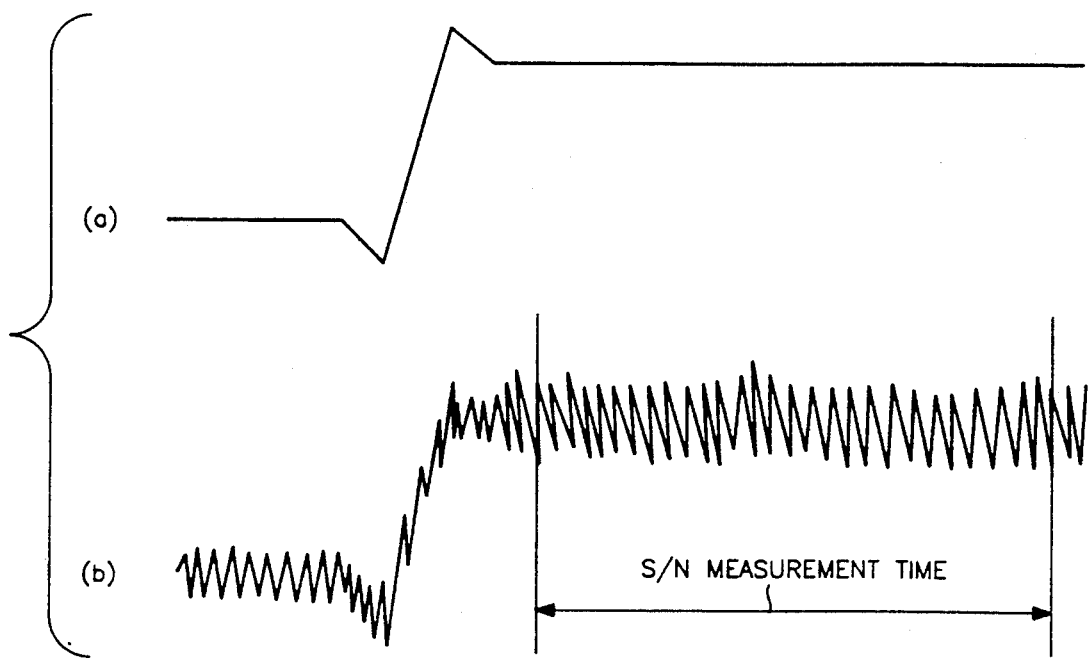
FIG. 6 is a waveform diagram showing the noise components in the waveform of the specific pattern signals that are overlapped on the television signals, and describes the problems with the conventional apparatus.

In the first embodiment, the output of the waveform extraction circuit 2 is supplied to the S/N measurement circuit 10 as well as to the adding & averaging circuit 3. As shown in FIG. 6(b), the S/N measurement circuit 10 measures the S/N during a predetermined period and supplies the measured S/N data to the S/N judgment circuit 12. In addition, the S/N data at this time can also be supplied to the adding & averaging circuit 3 for use as data for determining the number of times of addition for the adding & averaging processing. The adding & averaging circuit 3 uses this data as the basis for determining the number of times of addition so that the number of times of addition is reduced if there is a favorable status for the S/N, and the number of times of addition is increased if there is a poor status for the S/N.

The S/N judgment circuit 12 uses the S/N data that is supplied from the S/N measurement circuit 10 as the basis for judging whether or not the S/N is to a degree that the random noise components can be sufficiently suppressed by the adding and averaging processing by the adding & averaging circuit 3. More specifically, the degree S/N for which removal is possible is determined beforehand by test data. Also, time data from the timer 11 is also supplied to the S/N judgment circuit 12 so that a distinction can be made between when there is a temporary deterioration (pulse-type noise components) of the S/N and when there is a continuous deterioration of the S/N.

When it is judged by the S/N judgment circuit 12 that there is an included noise component that cannot be removed by adding and averaging processing, the hold signal is output from the S/N judgment circuit 12 and with respect to the coefficient setting circuit 8, and the coefficient setting circuit 8 that receives this hold signal prohibits the generation of new coefficient data and holds the previous coefficient data. In this manner, even if erroneous error signals due to the noise component included in the input television signals are output from the subtracter 6, it is possible to prevent an adverse influence to the output image.

Then, when the S/N has recovered to a favorable status, the former hold signal is cancelled and reset signal is output with respect to the waveform extraction circuit 2, adding & averaging circuit 3, differentiating circuit 4, subtractor 6 and the magnification setting circuit 7. The circuits inside the processing block 9 that receives the reset signal are reset so that the coefficient data that have been set by the coefficient setting circuit 8 is reset to be initialized. According, since the coefficient data are reset from the time that the S/N returns to the favorable status, there is no influence of the former ghost status (noise) and coefficient data suited to the current ghost status are generated.

In addition, the S/N judgment circuit 12 is such that it is not responsive to temporary deterioration of the S/N ratio due to sudden pulse-type noise due to the operation of the timer 11, and does not frequently apply reset signals to the processing block 9.

Moreover, in the embodiment described above, the coefficient setting circuit 8 is such that the former coefficient data are held by the hold signal but coefficient data that have been determined beforehand can be present and output instead. In addition, it is not necessary to reset all of the circuits inside the processing block 9 by the reset signal, as only the circuits which are necessary for initialization of the coefficient data that are generated by the coefficient setting circuit 8 need be reset.

Figure 8:
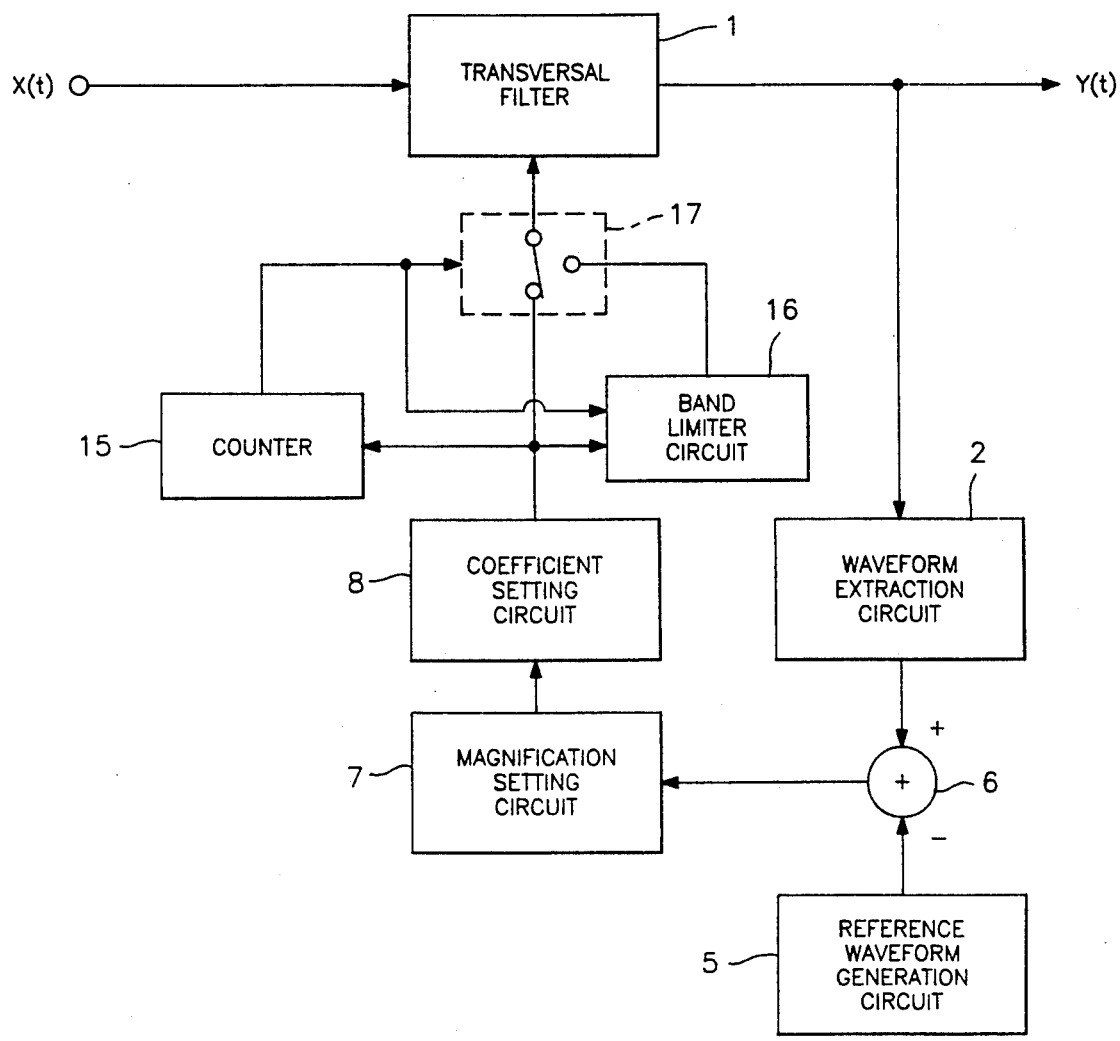
FIG. 8 is a block diagram that shows the configuration of a ghost removal apparatus according to a second embodiment of the present invention.
Figure 9:
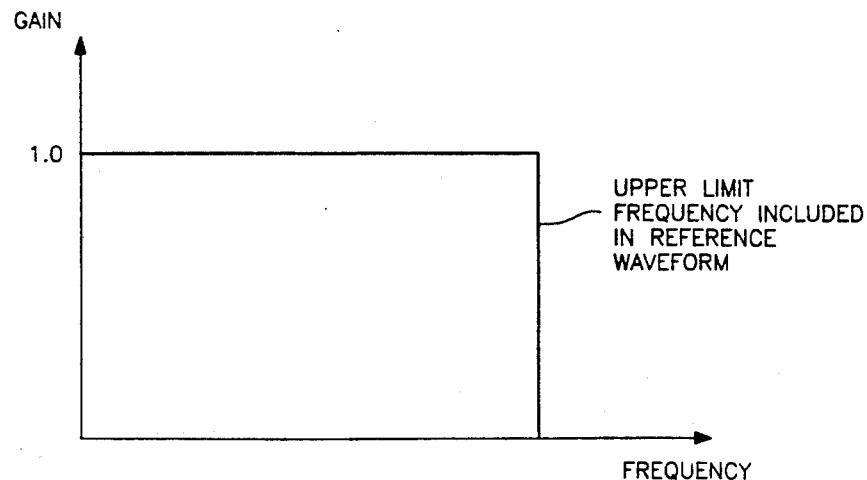
FIG. 9 is a characteristics diagram showing the frequency characteristics of a band limiter circuit in an apparatus according to the second embodiment shown in FIG. 8.

The following is a description of a second embodiment of the ghost removal apparatus relating to the present invention, with reference to FIGS. 8 and 9.

FIG. 8 is a block diagram that shows the configuration of a ghost removal apparatus according to a second embodiment of the present invention.

Figure 4:
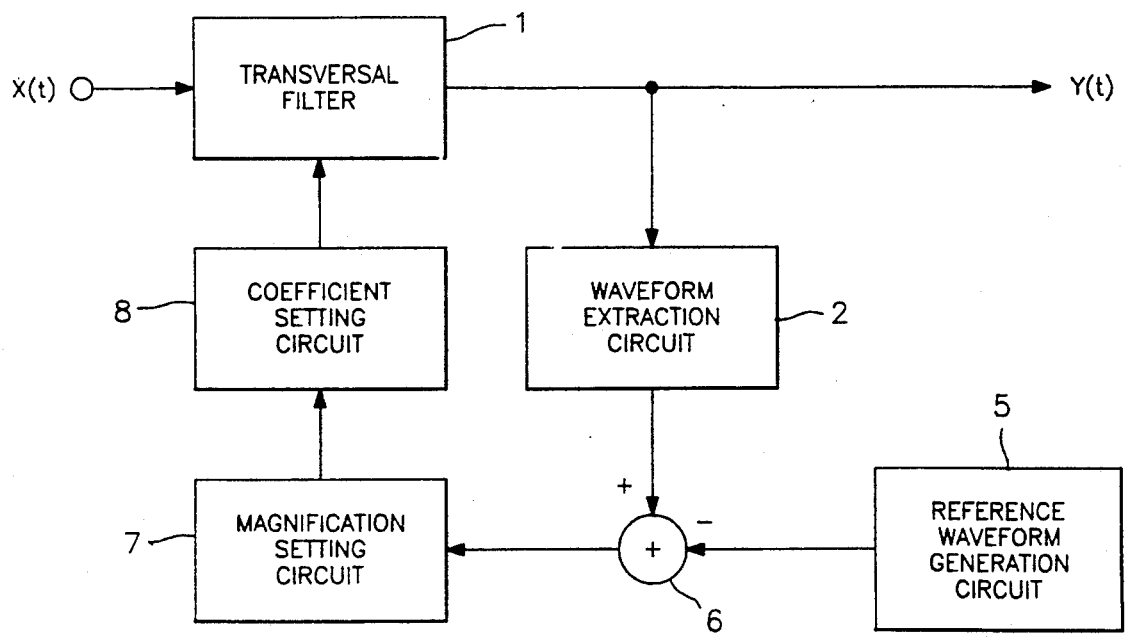
FIG. 4 is a block diagram that shows the configuration of the apparatus of the other example of a conventional ghost removal apparatus.
Figure 5:
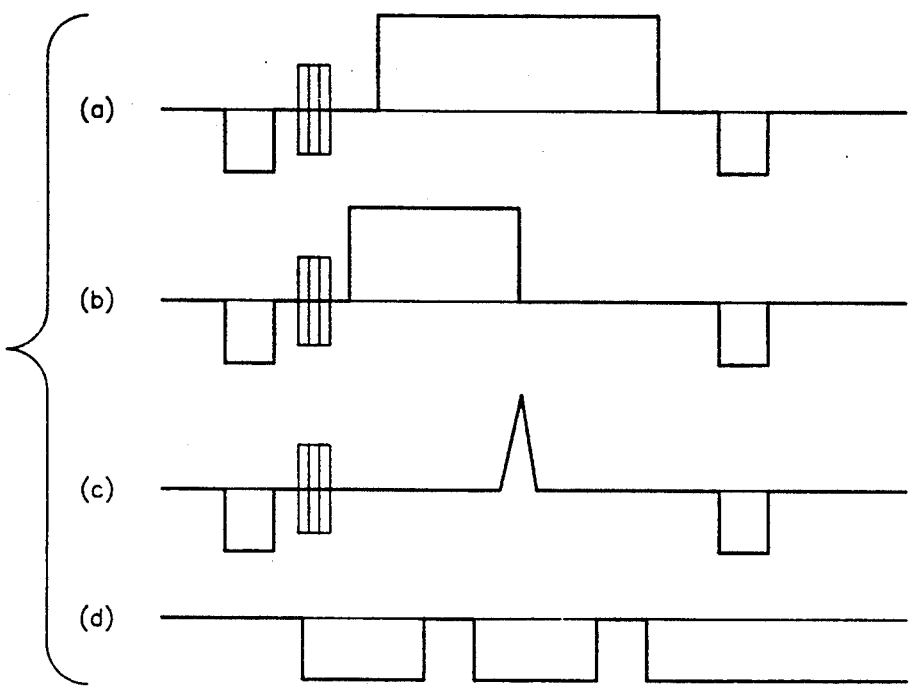
FIG. 5 is a waveform diagram that shows the waveform of the signals that have undergone differentiation processing, and the specific pattern signals in the apparatus according to the example shown in FIG. 4.

In the figure, the configuration of the ghost removal apparatus by closed loop control by a transversal filter 1, a waveform extraction circuit 2, a subtractor 6, a reference waveform generation circuit 5, a magnification setting circuit 7 and a coefficient setting circuit 8 is the same as that for the conventional technology shown in FIG. 4.

In this second embodiment, the output of the coefficient setting circuit 8 is also supplied to a counter 15 (detection means). The counter 15 counts the number of times that the coefficient setting circuit 8 has generated the coefficient data for up to the time when there is convergence on the status where ghost is removed, and when that number of times has become greater than a predetermined number of times, activates the band limiter circuit 16 (band limiting means) and the band-limited coefficient data are supplied to the transversal filter 1 through a switch 17. The band limiter circuit 16 has the low-pass filter characteristics shown in FIG. 9 and which are rated beforehand.

The following is a description of the operation of this second embodiment.

The coefficient data that are generated by the coefficient setting circuit 8 are used as the basis for changing the filter coefficients of the transversal filter 1, and the short removal action is the scene as that of the conventional technology. If there is an unnecessary high-region component outside of the frequency band that has the reference signals, included in the coefficient data, then it is no longer possible to remove the ghost sufficiently. In this second embodiment, closed loop control is repeated until ghost is sufficiently suppressed, and the coefficient data that is generated by the coefficient setting circuit 8 each time new batch of coefficient data are generated have an unnecessary high-region components and it is desirable that the data be passed through an unnecessary high-region component removal filter each time the coefficient data are calculated. However, if this is done, then the processing time becomes very long. For this reason, the number of times of calculation is counted by the counter 15 and unnecessary high-region component removal processing is not performed until that count value reaches a predetermined value. Only when the count value reaches the predetermined value, the counter 5 activates a band limiter circuit 16 so that the unnecessary high-region component outside of the frequency band component having the reference signals is no longer output to the transversal filter 1 and so the loop converges quickly to the correct convergence status.

What is claimed is:

1. A television ghost removal apparatus comprising:
   transversal filter means which receives input television signals, for compensating waveform distortion included in said input television signals and removing ghost components;
   waveform extraction means for extracting signal waveforms of predetermined periods which include reference signals for ghost detection from said television signals;
   coefficient setting means for comparing a reference waveform signal and the extracted signal waveform extracted by said waveform extraction means to obtain error signals, setting coefficient data corresponding to the obtained error signals, and in accordance with the coefficient data, changing filter coefficients of said transversal filter means;
   band limiter means for removing unnecessary high-region components included in said coefficient data, and supplying the coefficient data from which the unnecessary high-region components have been removed to said transversal filter means, the unnecessary high-region components being outside a frequency band of said reference signal; and
   counter means for counting the number of times that said coefficient data have been generated by said coefficient setting means until said television signals return to a status where ghost has been removed, and for activating said band limiter means when said number of times reaches a predetermined number.

* * * * *